United States Patent [19]

Ridgway et al.

[11] 3,895,002

[45] July 15, 1975

[54] READ AFTER WRITE MAGNETIC TRANSDUCING HEAD HAVING CROSS-TALK SHIELD MEANS

[75] Inventors: Peter Charles Ridgway, Staines; Desmond James Mapps, Twickenham, both of England

[73] Assignee: International Computers Limited, Hartsfordshire, England

[22] Filed: Oct. 11, 1973

[21] Appl. No.: 405,367

[30] Foreign Application Priority Data

Oct. 19, 1972 United Kingdom .............. 48152/72

[52] U.S. Cl. ................................ 360/128; 360/124

[51] Int. Cl. .......................... G11b 5/26; G11b 5/28

[58] Field of Search ............. 179/100.2 C, 100.2 K; 340/174.1 F; 346/74 MC; 360/124, 128, 129

[56] References Cited

UNITED STATES PATENTS 3,700,828 10/1972 Zacaroli ...................... 179/100.2 C

*Primary Examiner*—Bernard Konick

*Assistant Examiner*—Robert S. Tupper

*Attorney, Agent, or Firm*—George R. Douglas, Jr.

[57] ABSTRACT

A magnetic transducing head assembly which includes spaced first and second gapped cores mounted on a body member. A first magnetic screen is located between and extends transversely of, the first and second cores. A second magnetic screen is mounted on the body member to provide a flux path between the first screen member and the core of the first head at a point spaced from the first head. Both said screens have a transverse width which is less than that of the body member.

1 Claim, 5 Drawing Figures

READ AFTER WRITE MAGNETIC TRANSDUCING HEAD HAVING CROSS-TALK SHIELD MEANS

BACKGROUND OF THE INVENTION

This invention relates to magnetic transducing heads.

There is frequently a requirement for mounting two or more magnetic transducing heads in close proximity. One example of such requirement is the pairing of a read head and a write head for a single track of a computer tape equipment. There is a tendency for some stray flux from one head to link with the other head to cause cross-talk between the heads. This is the equivalent of reducing the signal/noise ratio which is clearly undesirable.

Various designs have been proposed in which cross-talk is reduced by the use of screens of magnetic material or by screens of electrically conducting material which operate by virtue of eddy current effects. In general these designs have not been suitable for producing an assembly of small heads with small spacing, or they have produced relatively small reductions in the amount of cross-talk.

SUMMARIES OF THE INVENTION

According to the invention there is provided a magnetic head assembly including a first magnetic head with a gapped magnetic core member, a second magnetic head with a gapped core member, the second head being adjacent to, but spaced from, the first head; a body member in which the first and second heads are mounted; a first magnetic screen member located between and extending transversely of the first and second heads, the width of the screen being not greater than the transverse width of the body member; and a second magnetic screen member having a transverse width not greater than that of the body member and having one or more elements positioned to provide a flux path between the core of the first head at a point spaced from the first head and the first screen member, said flux path having a reluctance which is selected to minimise magnetic signal transfer from the second head to the first head.

According to one feature of the invention the value of the reluctance of the flux path is adjustable.

According to another feature of the invention each head is surrounded by a separate conductive screening loop.

BRIEF DESCRIPTION OF THE DRAWINGS

The invention will now be described, by way of example, with reference to the accompanying drawings, in which.

DESCRIPTION OF THE PREFERRED EMBODIMENT

Figure 1:
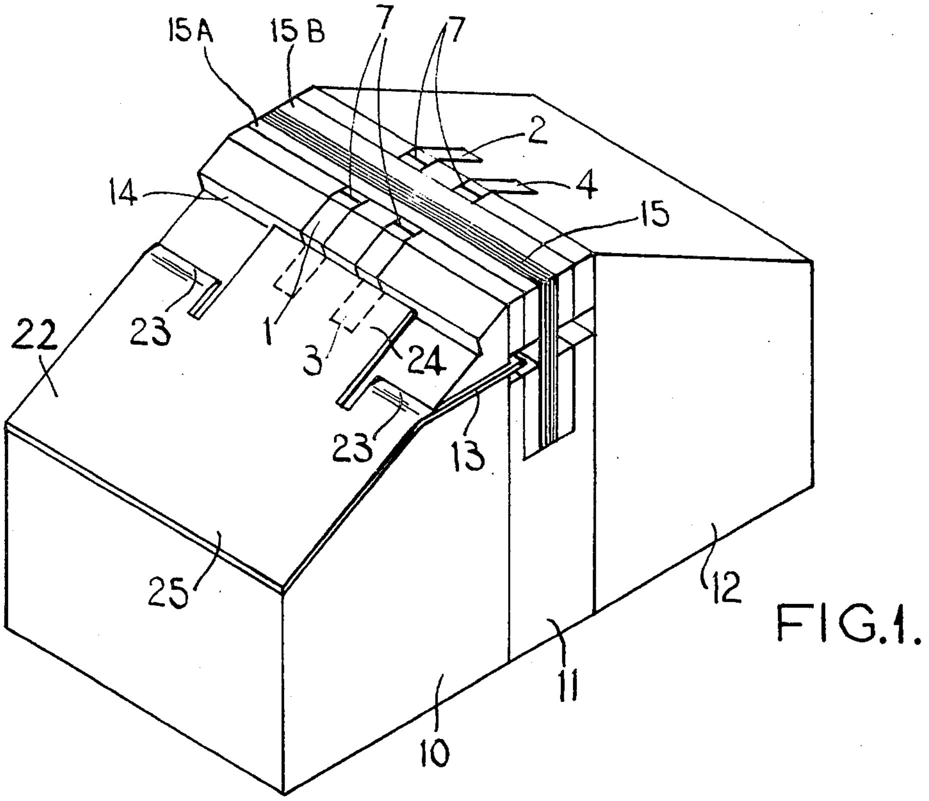
FIG. 1 is a perspective view of a two track magnetic tape head.

A magnetic head assembly provides a read head 1 (FIG. 1) and a write head 2 for one track and a read head 3 and a write head 4 for a second track. Each head has a magnetic core consisting of a C-member 5 and an I-member 6, as indicated diagrammatically in FIG. 2A. There is a non-magnetic gap 7 between the two core members to provide the reading or writing gap and there is a coil, 8 and 9, on each core. The core members 5 and 6 may be made of Mumetal (R.T.M.), ferrite, or other suitable magnetic material.

The heads are mounted in a body of electrically conducting non-magnetic material, such as brass or aluminium, which is assembled from parts 10, 11 and 12 for ease of construction. The body is slotted to accept the heads 1 to 4 and to hold them in the desired position. The part 10 has a slot 13 at either side and a cut out section 14 on the upper surface. The part 11 is slotted to accommodate a central magnetic screening member 15, and suitable spacers 15A and 15B. The spacer 15A and the part 11 is slotted at 13A on either side, the slots 13A aligning with the corresponding slot 13. The upper surface of the assembly is lapped, or otherwise treated, to provide a smooth surface over which the magnetic tape may pass with the minimum of wear.

Figures 2A, 2B:
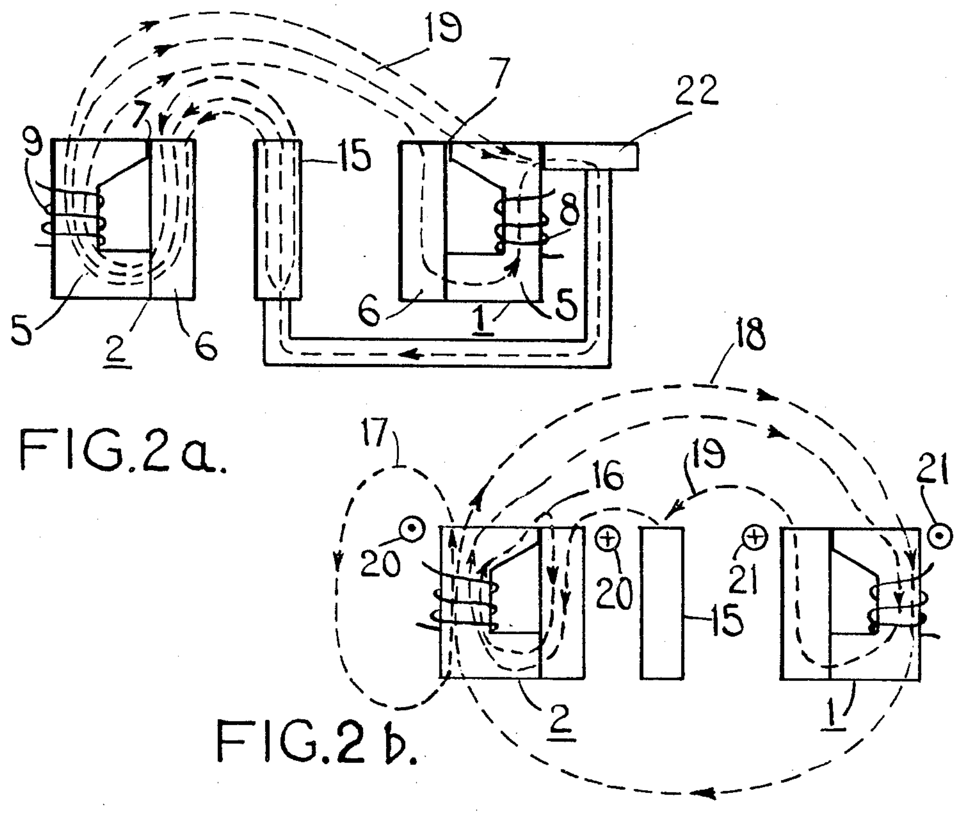
FIGS. 2A and 2B are schematic diagrams illustrating flux distributions in a dual head system.

When the coil 9 of the head 2 is energised, the majority of the magnetic flux circulates with the core 5, 6 of the head as indicated by the flux line 16 (FIG. 2B). However, there is also leakage flux which is undesirable because it may link with others of the heads and generate spurious signals. A first part of the leakage flux, indicated by flux line 17, does not link with the head 1, but it might link with the head 4. A second part of the leakage flux, indicated by flux line 18, links with the head 1 only. A third part of the leakage flux, indicated by flux line 19, links with the head 1 and with the screen 15.

The portions of the body which surround the head 2 form a closed conducting loop which is indicated by wire 20 in FIG. 2B. The flux lines 17 and 18 link with this loop and will tend to produce an eddy current flow in the loop in the direction shown. Similarly, the closed conducting loop around the head 1 is indicated by wire 21. The flux line 18 links with this conductive loop and tends to produce an eddy current flow in the direction shown. The flux produced by the eddy current flow is in opposition to the generating flux, so that the conductive loops have the effect of substantially reducing these components of the leakage flux.

The conducting loops around the heads are shown as being separate. The current flowing in the loop 20 is considerably larger and in opposition to the current flowing in the loop 21. Accordingly, for optimum suppression, no current from the loop 20 should be allowed to flow in the loop 21. This can be ensured by making the part 11 as two sections with insulation in between, so that the halves of the body which carry the reading and writing heads, respectively, are electrically separate. This is often impracticable because of the difficulty of ensuring uniformity in the spacing between the read and write gaps for a batch of head assemblies. However, if care is taken in ensuring that the body provides a low resistance path around each head, there will be little tendency for interaction between the current loops.

The flux which is represented by the line 19 does not link with either conductive loop to generate a current. This flux is not affected by the conductive loop and remains as a source of cross-talk between the heads 1 and 2. The level of cross-talk can be reduced to a relatively small value by the introduction of a further magnetic screening member 22 which provides a flux balancing or nulling effect. The member 22 provides a flux return path to the central screen 15. For the sake of clarity the other flux paths shown in FIG. 2B have been omitted from FIG. 2A.

When the reluctance of the return path is relatively low, indicated in FIG. 2A by the member 22 being in contact with the core member 5, the leakage flux circulates in the core 1 in one direction. When the return path has a relatively high reluctance, indicated in FIG. 2B by the absence of the member 22, the leakage flux in the core 1 is in the opposite direction. Hence, there is an intermediate value of reluctance for which the value of leakage flux circulating in the core 1 is substantially zero.

One convenient form for the member 22 is provided by cutting and bending a sheet of Mumetal to provide two legs 23 which fit within the slots 13 in the body part 10, and a leg 24 which fits within the cut out section 14. The legs are joined by the bridging section 25. The length of the legs 23 is such that there is a small air gap between their ends and the central screen 15, when the end of the leg 24 is against the cores of the heads 1 and 3. The size of this air gap is such that the overall reluctance of the magnetic path from the heads to the screen 15 via the screen 22 is that required to give the minimum effective flux linkage between the heads. This value must be determined by experiment for each design of head assembly. However, it has been found that once the value of air gap appropriate to a particular design has been established this value may be used in the mass production of heads to that design to provide a degree of reduction of cross-talk which is satisfactory in practice. It will be appreciated that this is so only if the head assembly is manufactured to close tolerances. Of course, each head assembly may be adjusted for minimum cross-talk by moving the screen 22 towards or away from the screen 15 to change the size of the air gap between the screen 22, the screen 15 and/or the head cores. This adjustment will ensure that the best results are obtained for each head assembly, but it will add appreciably to the cost of producing the assembly.

It will be clear from the preceding description that the function of the shield member 22 is essentially to provide a return flux path of controlled reluctance between the head core and the central screen 15. Accordingly the screen 22 may take a variety of forms other than that which has been described, provided it is remembered that the screen 22 must be spaced away from the gap area of the head sufficiently for it not to interfere with the operation of the head.

Figure 3:
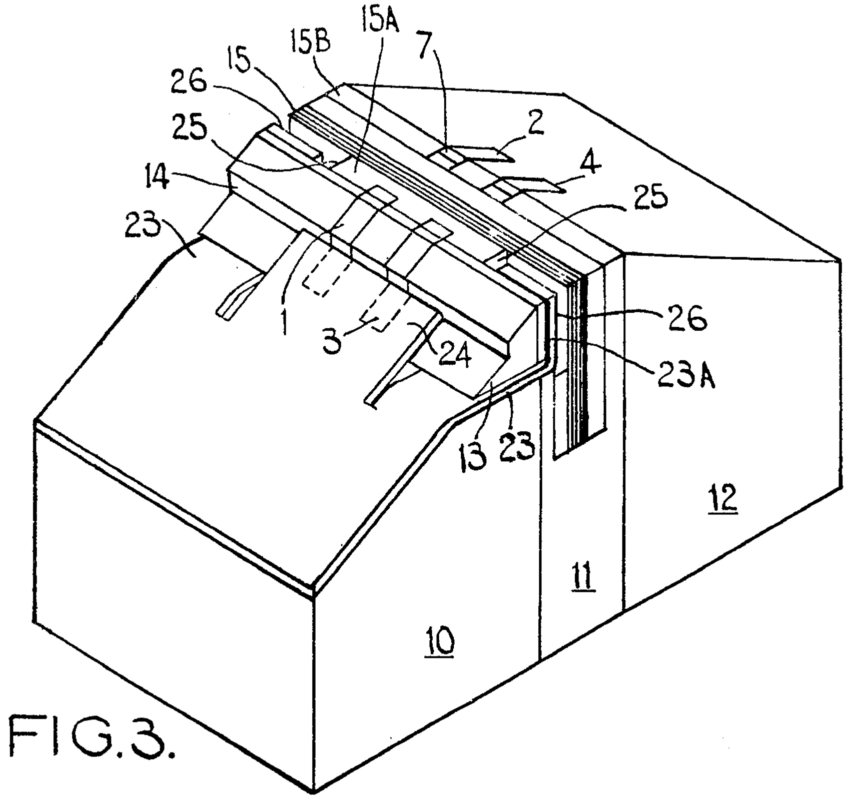
FIG. 3, is a perspective view of a modification of the construction of FIG. 1.
Figure 4:
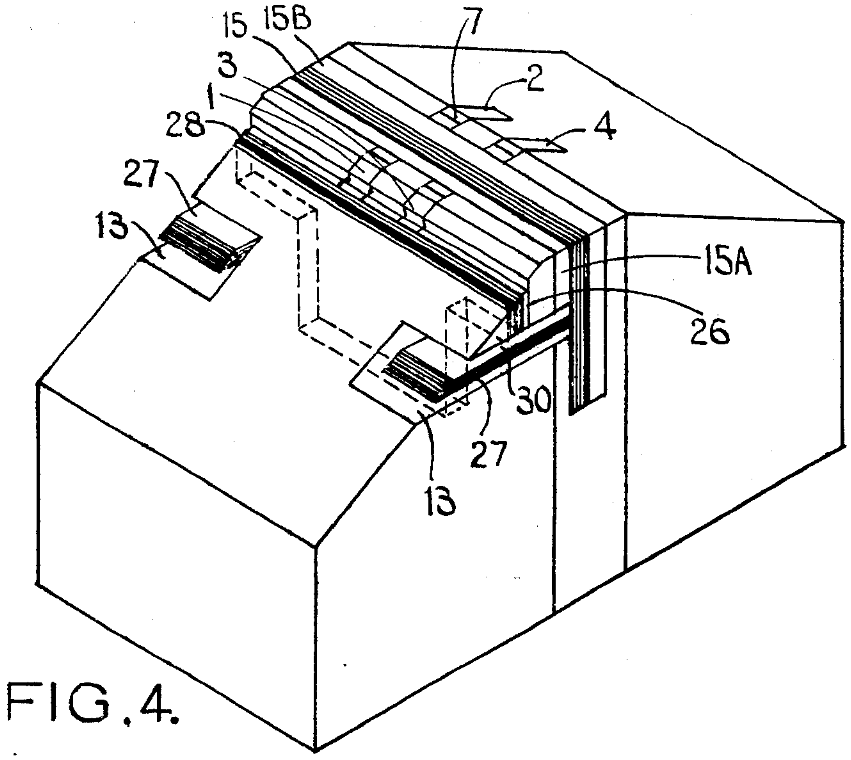
FIG. 4 is a perspective view of a second modification of the head construction of FIG. 1.

Alternative forms of construction are shown in FIGS. 3 and 4 in which elements similar to those mentioned in relation to FIG. 1 are identified by similar reference numbers. In the construction of FIG. 3 the screen 22 is similar to the form shown in FIG. 1 except that the legs 27 are extended in length at the free end portions 23A are bent to lie in a vertical plane. Conveniently, the body member 10 or spacer 15A is slotted, recessed or otherwise cut away to accommodate the leg ends 23A. For convenience, in the Figure the spacer 15A is shown with cut-away corners as at 25 which provide an air gap 26 between the leg end 23A and the adjacent part of the screen 15. It will be clear that by suitably deforming the leg ends 23A with respect to the screen 15 the air gap in the flux path can be selectively adjusted.

In the construction of FIG. 4, strip parts 27 corresponding to the legs 23 of FIG. 1 are attached to the control screen 15 and the element 22 is replaced by a vertically extending screen 28 located in a slot 29 provided in the body part 10 so that the screen 28 is roughly parallel to the screen 15. The air gap 26 in the flux path from screen to screen is provided between the screen 28 and the strip parts 27.

It will be clear that the individual components such as the screen 28 and strip parts 27, can have various shapes depending upon the particular mode of construction. For example the T shaped construction illustrated in the case of screen 28 could be replaced by a rectangular element with slots for receiving the strip parts 27. Furthermore the legs 23 or the strip parts 27 may be made with non-uniform cross section to provide the desired reluctance.

All or part of the screens 15 and 22 and 28 may be made of other magnetic materials of suitable permeability, such as ferrite. It has been found in practice that improved results are obtained if the screen 15 is positioned as close as possible to the write heads. However, this is in conflict with the need to provide a good conductive path round the head to eliminate other forms of interfering flux leakage, when the head assembly is small. Consequently it is generally necessary to comprise between these two requirements.

Although the invention has been described in relation to a two track head, it will be understood that it is equally applicable to a single track system or, say, a nine track system. However, if there are many tracks with simultaneous energisation of the write heads, the field patterns become complex and the degree of reduction of cross-talk which it is possible to obtain may be substantially less than is possible in the case of a single track system.

We claim:

1. A magnetic head assembly including a magnetic recording head comprising a first magnetic core having a first non-magnetic gap and a first winding coupled to said first core; a magnetic reproducing head comprising a second magnetic core having a second non-magnetic gap and a second winding coupled to said second core; a body member of electrically conductive material supporting the recording head and the reproducing head in spaced relationship to each other with the first and second non-magnetic gaps lying substantially parallel to one another in a front face of the body member and spaced in a direction of relative movement between the head assembly and a record medium; said body member having a first slot extending transversely of said direction between said recording and reproducing heads and opening in said front face; a first magnetic screen located in said first slot and extending from said front face between the recording and reproducing heads transversely of said direction; said body member having a recess in said front face extending from said second core away from the first screen and exposing an edge of the second core remote from the first screen; said body member having a pair of spaced second slots extending in said direction, with the reproducing head located therebetween, between said first slot and said recess; a second magnetic screen of unitary structure comprising a main portion and a central leg and two side legs extending therefrom, said central portion and central leg being located in said recess with the central leg in abutment with said exposed edge of the second core and said side legs being located one within each of the second slots respectively; an end of each side leg being located adjacent said first screen and spaced from the first screen by third non-magnetic gaps.

* * * * *